United States Patent [19]
Kazama et al.

[11] Patent Number: 4,946,323
[45] Date of Patent: Aug. 7, 1990

[54] CHAMFERING DEVICE

[75] Inventors: Yasuo Kazama; Osahiko Miyazaki, both of Tokyo, Japan

[73] Assignee: Nitto Kohki Co., Ltd., Tokyo, Japan

[21] Appl. No.: 395,982

[22] Filed: Aug. 21, 1989

[30] Foreign Application Priority Data

Aug. 31, 1988 [JP] Japan ............... 63-114293[U]

[51] Int. Cl.⁵ ............................................. B23C 1/20
[52] U.S. Cl. .............................. 409/178; 30/477; 144/134 D; 144/136 C; 409/180
[58] Field of Search ................. 409/178, 180, 218; 144/134 D, 136 C; 408/14, 188, 241 S; 30/477

[56] References Cited

U.S. PATENT DOCUMENTS 3,196,749 7/1965 Zanni .............................. 409/190
4,329,092 5/1982 Pöitzsch et al. ............... 408/14 X

FOREIGN PATENT DOCUMENTS 7415364 11/1975 Fed. Rep. of Germany.
32-3484 4/1957 Japan.
63-116246 7/1988 Japan.

*Primary Examiner*—Z. R. Bilinsky
*Attorney, Agent, or Firm*—Nixon & Vanderhye

[57] ABSTRACT

A chamfering device comprising a housing in which a motor is housed, a guide base arranged at one end of this housing, a rotating shaft which is driven by the motor and whose front end is projected outside from the guide base, a chamfering blade fixed to the front end portion of the rotating shaft, partly projecting outside from the guide base, and a guide located further on the front side of the rotating shaft than the chamfering blade and attached to the front end of the rotating shaft. The guide can be contacted with the face adjacent to the chamfering portion of a workpiece.

6 Claims, 2 Drawing Sheets

CHAMFERING DEVICE

BACKGROUND OF THE INVENTION

1. Field of the Invention

The present invention relates to a portable chamfering device most suitable for chamfering the peripheral edge of a hole and the edge portion of a curved face.

2. Description of the Related Art

The conventional portable chamfering device intended to chamfer the rim portion of a workpiece by a rotating cutter which is provided with a cutting blade on the outer circumference comprises a body having the rotating cutter at the front end thereof, and a guide attached to the body and having a pair of guide planes perpendicular to each other to be contacted with the corner of the workpiece, said guide serving to project the cutting blade of the rotating cutter, at a tilted angle, into a space defined by the two guide planes. When chamfering is to be carried out by this chamfering device, the chamfering device is moved keeping the guide planes contacted with the corner of the workpiece to be processed.

When the peripheral edge of a hole or the edge portion of a curved face is to be chamfered by the conventional portable chamfering device, however, the crossed guide planes which are adjacent to the cutting blade become hindrances preventing the chamfering device from being smoothly moved along the inner face of the hole or the contour of the curved face. This makes it impossible to chamfer these faces with high efficiency.

SUMMARY OF THE INVENTION

The object of the present invention is to provide a portable chamfering device capable of easily chamfering the peripheral edge of a hole and the edge portion of a curved face.

A chamfering device according to the present invention comprises a guide base attached to one end of a housing in which a motor is housed, a rotating shaft which is driven by the motor and whose end is projected outside from the guide base, a chamfering blade fixed to the front end portion of the rotating shaft, partly projecting outside from the guide base, and a guide located further on the front side of the rotating shaft than the chambering blade and attached to the front end of the rotating shaft, wherein said guide can be contacted with the face adjacent to the chambering portion of a workpiece.

When chamfering is to be carried out by this chamfering device, the rotating shaft is rotated keeping the guide base contacted with the plane portion of a workpiece to be processed, and the chamfering device is moved, contacting the guide with the edge of a hole or a curved face and cutting the intended area of the hole or curved portion by the cutting blade. The chamfering the edge of the hole or curved face can be attained in this manner.

According to the chamfering device of the present invention, therefore, the peripheral edge of a hole or the edge portion of a curved face can be easily chamfered although these edges could not be chamfered by the conventional chamfering device.

BRIEF DESCRIPTION OF THE DRAWINGS

The accompanying drawings show an example of the chamfering device according to the present invention, in which.

DETAILED DESCRIPTION OF THE PREFERRED EMBODIMENT

Figure 1:
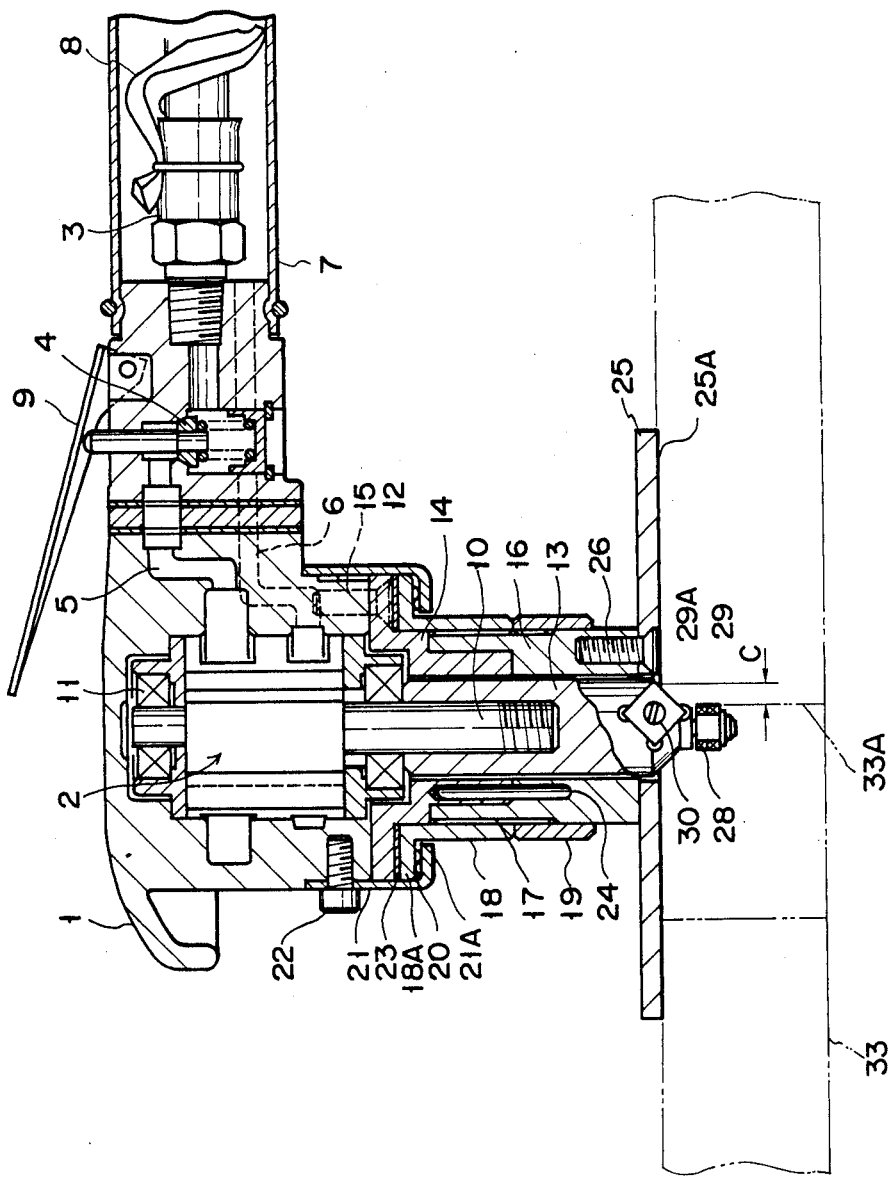
FIG. 1 is a front sectional view showing the chamfering device.

An example of the chamfering device according to the present invention shown in FIG. 1 comprises L-shaped handle portion 1 which houses air motor 2 serving as a drive source. Air supply to this air motor 2 is attained through hose 3 connected to the back end of handle portion 1, valve 4 for allowing compressed air, which is supplied through hose 3, to be selectively introduced by means of lever 9, and path 5 connected to this air supply valve 4. Air discharge from air motor 2 is achieved through path 6 and hose 7. Sponge 8, which serves as a muffler, is wound around the outer surface of air supply hose 3, and air discharge hose 7 covers outer periphery thereof.

Motor shaft 10 of air motor 2 is supported in handle portion 1 by means of a pair of ball bearings 11 and 12, and rotating shaft 13 is threadably fixed onto motor shaft 10.

Stepped boss 14 through which rotating shaft 13 passes is fixed to that lower end face of handle portion 1, through which motor shaft 10 is projected, by means of screws 15. Slide boss 16 through which rotating shaft 13 passes is fitted, slidably in the axial direction of rotating shaft 13, onto the extended portion of boss 14. Male thread 17 is formed on the outer face of slide boss 16 and flange-shaped adjusting ring 18 and fixing ring 19 which serves as the stopper for adjusting ring 18 are screwed onto male thread 17 on slide boss 16. In order to allow adjusting ring 18 to be rotated at its certain position, holder 21 is fixed to handle portion 1 by screws 22 and flange portion 18A of adjusting ring 18 is supported from below by means of terrace portion 21A which is inwardly curved at the lower end of holder 21. Wave washer 20 is interposed between flange portion 18A of adjusting ring 18 and terrace portion 21A of holder 21, so that flange portion 18a of adjusting ring 18 can be urged against the underside of boss 14 through spacer 23 due to the elasticity of this washer 20. Pin 24 which is fixed to slide boss 16 and fitted into boss 14 serves as a stopper for preventing slide boss 16 from being rotated together with adjusting ring 18 when this adjusting ring 18 rotates, and it also serves to smoothly guide slide boss 16 when this slide boss 16 slides relative to boss 14.

Guide base 26 having guide plane 25A directed rectangular to rotating shaft 13 is fixed to the underside of slide boss 16 by means of screws 26, and rotating shaft 13 is projected from this guide base 25 substantially in the center thereof. Guide bearing 28, having smaller outer diameter than that of rotating shaft 13, is freely rotatably attached to the substantially cone-shaped front end of rotating shaft 13. Chamfering cutter 29 having blade 29A tilted relative to guide plane 25A is fixed to that outer circumferential portion of rotating shaft 13, which is located below guide bearing 28, by means of screws 30.

Figure 2:
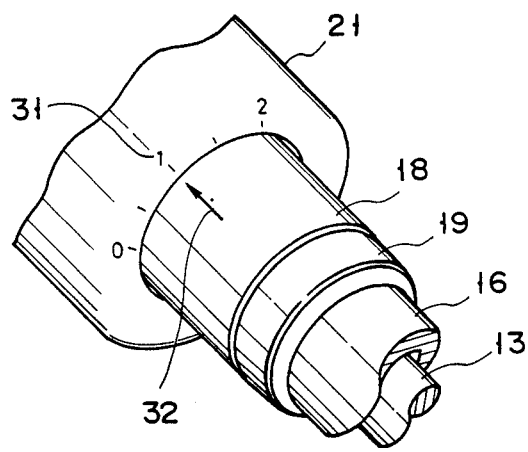
FIG. 2 is a perspective view showing a part of the chamfering device.

Chamfering amount C of a workpiece is represented by the distance between two imaginary vertical lines, i.e., one passing through the outer circumferential face of guide bearing 28 and the outer passing through the point where blade 29A crosses guide plane 25A when cutter 29 is positioned as shown in FIG. 1. Chamfering amount of the workpiece can be thus adjusted by moving guide base 25 up and down. When adjusting ring 18 is rotated at its certain position, slide boss 16 which has been screwed into adjusting ring 18 is slid to move guide base 25 up and down. The amount of guide base 25 to be moved can be readily determined by the pitch of male thread 17 on slide boss 16 and by the rotation number of adjusting ring 18. In order to make this adjustment easy, graduations 31 which denote chamfering amounts are carved on the underside of holder 21 while reference line 32 for graduations 31 is also carved on adjusting ring 18, as shown in FIG. 2.

The operation of the above-described embodiment according to the present invention will be described below.

In order to adjust the chamfering amount of a workpiece, lock ring 19 is loosened and adjusting ring 18 is rotated in a predetermined direction by a certain number of turns. Since adjusting ring 18 is arranged to rotate at its certain position, slide boss 16 which has been screwed into adjusting ring 18 is slid to move the guide base up and down as adjusting ring 18 is rotated. When adjusting ring 18 is rotated left, for example, guide base 25 is retreated so that chamfering amount C of the workpiece can be increased. When adjusting ring 18 is rotated right, however, guide base 25 advances to thereby reduce the chamfering amount of the workpiece. After the chamfering amount of the workpiece is set, lock ring 19 is tightened to fix adjusting ring 18.

After the chamfering amount of the workpiece is set in this manner, lever 9 is pushed, while gripping handle portion 1 by hand, to start air motor 2 to drive cutter 29. When inner peripheral face 33A of the hole of workpiece 33 is to be chamfered, for example, guide plane 25A of guide base 25 is rested on the surface of workpiece 33, while inserting the front end of rotating shaft 13 into the hole of workpiece 33 with cutter 29 kept driven. When the chamfering device is moved, urging the outer circumferential face of guide bearing 28 against and along inner peripheral face 33A of the hole, blade 29A of cutter 29 which has been fixed to rotating shaft 13 together with guide bearing 28 follows the contour of the hole to chamfer the peripheral edge of its peripheral face 33A. When any of curved portions is to be chamfered, guide bearing 28 is similarly moved to follow an intended surface of the curved portion, so that blade 29A of cutter 29 which has been fixed to rotating shaft 13 together with guide bearing 28 can chamfer the edge portion along its intended curved surface.

It should be understood that the present invention is not limited to the above-described embodiment but that various changes and modifications can be made without departing from the spirit and scope of the present invention.

Transmission of power to drive the cutter has been attained directly through the motor shaft, but power may be transmitted through gears. The cutter driving source is not limited to air motor 2 but it may be a hydraulic or electric motor. The system for moving guide base 25 up and down is not limited to the one intended to rotate adjusting ring 18 screwed onto slide boss 16 to which guide base 25 is attached, but it may be variously modified. Although the chip-shaped cutter has been attached to the rotating shaft, the rotating shaft itself may be processed to have plural cutting blades thereon.

There has been described the case where guide base 25 is moved up and down to adjust chamfering amount C of the matter, but the outer diameter of guide bearing 28 may be changed to adjust chamfering amount c of the matter.

Guide bearing 28 may be fixed, or the front end itself of rotating shaft 13 may be shaped like guide bearing 28, or guide bearing 28 may be attached to others except rotating shaft 13.

What is claimed is:

1. A chamfering device comprising:
 a housing containing a motor;
 a rotating shaft extending along an axis and having first and second end portions connected to the motor;
 a rectangular cutter in the form of a thin plate, for chamfering that corner portion of a workpiece which is defined by a curved surface and a flat surface, said cutter being fixed to the second end portion of said rotating shaft and having a chamfering blade inclined with respect to the axis of said rotating shaft;
 a guide provided on the second end portion of said rotating shaft and located at a position farther from the first end portion of said rotating shaft than the position of the chamfering blade, said guide being rotatable on the curved surface of said corner portion of the workpiece;
 a fixed boss in the form of a hollow cylinder having an axis, and which is fixed to said housing and through which said rotating shaft passes;
 a slide boss in the form of a hollow cylinder having first and second end portions which are mounted on said fixed boss so as to be movable only in the axial direction of said fixed boss;
 a plate-like guide base fixed to the second end portion of said slide boss and having a guide plane perpendicular to the axis of said rotating shaft, said guide plane being slidable on the flat surface of said corner portion of the workpiece; and
 an adjusting ring, mounted on said fixed boss so as to be rotatable around the axis thereof, for moving said slide boss in its axial direction and adjusting the amount of projection of said chamfering blade with respect to a plane including said guide plane.

2. The device according to claim 1, wherein said adjusting ring and slide boss each have male and female threads engaging each other.

3. The device according to claim 2, wherein said guide rotates around said rotating shaft.

4. The device according to claim 1, wherein said handle portion has a holder for rotatably holding said adjusting ring, and graduations and a reference line are carved on outer circumferential faces of said adjusting ring and said holder to set the moving amount of the guide base.

5. The device according to claim 1, wherein said guide rotates around said rotating shaft.

6. The device according to claim 1, wherein said guide rotates around said rotating shaft.

* * * * *